United States Patent [19]

Mathis et al.

[11] Patent Number: 5,680,653
[45] Date of Patent: Oct. 28, 1997

[54] SURGICAL GOWN CUFF AND METHOD FOR MAKING THE SAME

[75] Inventors: Michael Peter Mathis, Marietta; Uyles Woodrow Bowen, Jr., Canton; Timothy Wilson Reader, Suwanee, all of Ga.

[73] Assignee: Kimberly-Clark Worldwide, Inc., Neenah, Wis.

[21] Appl. No.: 347,989

[22] Filed: Dec. 2, 1994

[51] Int. Cl.$^6$ .................... A41D 13/00; B32B 33/00; B32B 7/00
[52] U.S. Cl. .................. 2/123; 2/114; 2/51; 2/239; 428/343; 428/346; 442/394
[58] Field of Search .................. 2/114, 51, 46, 2/123, 457, 221, 400, 401, 406, 237, 239, 243.1, 901; 428/195, 200, 236, 295, 343, 346, 351, 355, 317.1, 347, 355 R; 604/389, 392

[56] References Cited

U.S. PATENT DOCUMENTS

| | | | |
|---|---|---|---|
| 2,668,294 | 2/1954 | Gilpin | 2/114 |
| 3,045,815 | 7/1962 | Abildgaard | 206/63.2 |
| 3,547,765 | 12/1970 | Snyder et al. | 2/46 |
| 3,727,239 | 4/1973 | Thompson | 2/123 |
| 3,868,728 | 3/1975 | Krzewinski | 2/114 |
| 4,041,203 | 8/1977 | Brock et al. | 428/157 |
| 4,114,200 | 9/1978 | Smith et al. | 2/51 |
| 4,214,320 | 7/1980 | Belkin | 2/114 |
| 4,586,196 | 5/1986 | White | 2/114 |
| 4,720,415 | 1/1988 | Vander Wielen et al. | 428/152 |
| 4,736,467 | 4/1988 | Schwarze et al. | 2/114 |
| 4,906,495 | 3/1990 | Martini et al. | 442/394 |
| 4,932,078 | 6/1990 | Jones et al. | 2/70 |
| 4,943,475 | 7/1990 | Baker et al. | 428/246 |
| 4,965,122 | 10/1990 | Morman | 428/225 |
| 4,981,747 | 1/1991 | Morman | 428/198 |
| 4,991,232 | 2/1991 | Taylor | 2/51 |
| 4,996,722 | 3/1991 | Jimenez et al. | 2/51 |
| 5,001,785 | 3/1991 | Heiman et al. | 2/114 |
| 5,025,501 | 6/1991 | Dillon | 2/51 |
| 5,042,088 | 8/1991 | Sherrod et al. | 442/401 |
| 5,169,712 | 12/1992 | Tapp | 442/394 |
| 5,226,992 | 7/1993 | Morman | 156/62.4 |
| 5,320,891 | 6/1994 | Levy et al. | 428/108 |
| 5,336,545 | 8/1994 | Morman | 428/152 |
| 5,393,599 | 2/1995 | Quantrille et al. | 442/394 |
| 5,422,172 | 6/1995 | Wu | 442/328 |
| 5,445,874 | 8/1995 | Shehata | 442/394 |

FOREIGN PATENT DOCUMENTS 3066366  3/1991  Japan.

*Primary Examiner*—Amy B. Vanatta
*Attorney, Agent, or Firm*—David J. Alexander

[57] ABSTRACT

An elastic laminate, and particularly a liquid impermeable elastic laminate, having a stretchable layer secured to an elastic liquid impermeable film wherein the film is formed from an elastic self-adhering adhesive is disclosed. The disclosed elastic laminate may be incorporated in a variety of products, such as diapers, feminine care articles, stockinettes, cuffs, and garments, such as surgical gowns.

29 Claims, 3 Drawing Sheets

SURGICAL GOWN CUFF AND METHOD FOR MAKING THE SAME

FIELD OF THE INVENTION

This invention relates to gowns and other garments and particularly to surgical gowns and methods for making the same. More particularly, this invention relates to improved cuff structures and methods of assembly. The use of such structures provides improved comfort, barrier properties, and protection to the wearer's body and particularly to those portions of the wearer's body overlaid by such cuffs.

BACKGROUND OF THE INVENTION

As is generally known, sterile surgical gowns are designed to greatly reduce, if not prevent, the transmission through the gown of liquids and biological contaminates which may become entrained therein. In surgical procedure environments, such liquid sources include the gown wearer's perspiration, patient liquids such as blood, salvia, perspiration and life support liquids such as plasma and saline.

Many surgical gowns were originally made of cotton or linen and were sterilized prior to the use in the operating room. These gowns, however, permitted transmission or "strike-through" of many of the liquids encountered in surgical procedures. These gowns were undesirable, if not unsatisfactory, because such "strike through" established a direct path for transmission of bacteria and other contaminates to and from the wearer of the gown. Furthermore, the gowns were costly, and, of course, laundering and sterilization procedures were required before reuse.

Disposable surgical gowns have largely replaced linen surgical gowns. Because many surgical procedures require generally a high degree of liquid repellency to prevent strike-through, disposable gowns for use under these conditions are, for the most part, made entirely from liquid repellent fabrics.

In an effort to provide greater comfort, disposable surgical gown manufacturers generally incorporate sufficient material into the construction of the surgical gown so that the gown is generally loose fitting. However, portions of the gown, such as the cuffs and collar, may be designed to form-fit about the respective portions of the wearer's body. As such, the cuffs and collar may be elastic. Elastic cuffs and collars may include a variety of fabrics. Examples of such fabrics include cotton, knits and polyester knits.

In some surgical procedures, where the risk of insult to the surgical gown is low, surgical gowns having cuffs formed from liquid permeable or liquid absorbent fabrics may provide adequate protection for the wearer. However, in other surgical procedures, where the risk of insult to the surgical gown is high, additional protection may be desirable. In some instances, to provide additional protection, a glove is sometimes worn which is sized to overlap the cuff and a portion of the sleeve.

However, when the sleeve cuff is formed from liquid retentive fabrics and is over-gloved by a surgical glove, perspiration formed within the gown sleeve may collect in the cuffs. As the amount of perspiration retained in the cuff increases, the liquid may migrate to the cuff/glove interface. Furthermore, the wearer's hand and arm movement may cause the retained perspiration to migrate beyond the cuff and into the portion of the sleeve adjacent the cuff. Strike-through may then occur when liquids generated during the surgical procedure contact the wearer's perspiration in the area of the sleeve and cuff.

Additionally, in instances where the wearer's perspiration has not migrated beyond the glove but has saturated or soaked the cuff material, there still remains the risk of the wearer being contacted by liquids which have been generated during the surgical procedure. This is so because, liquids on the outer surface of the gown sleeve may travel down the sleeve and contact the perspiration laden cuff before or during the removal of the glove and or gown.

In other instances, surgical gowns used in high insult surgical procedures may also be provided with cuffs formed from liquid repellent materials. However, liquids, generated during surgery which by-pass the glove and reside on the gown sleeve may contact the wearer during removal of the gown and or glove.

And still in other instances, surgical gown cuffs have been formed from a liquid impermeable sheet or tube which is captured between a pair of layers of stretchable material. However, the manufacture and assemblage of these cuffs requires aligning and then securing each of the stretchable material layers to the liquid impermeable sheet so that the spacial orientation between the stretchable layers and the liquid impermeable sheet is maintained.

Furthermore, as it is sometimes desirable that the cuff be elastic, incorporating an elastic sheet or tube into the design of the cuff generally increases the overall thickness or bulk of the cuff. The increased thickness of the cuff in conjunction with the practice of over-gloving the cuff may restrict or impair the wearer's freedom of movement and/or blood circulation in the wrist and hand area. Reduced ease of movement and/or blood circulation in the wrist and hand area may induce early fatigue in the muscle groups associated with such movement.

Therefore, there exists a need for surgical gowns and methods of making the same which provide improved barrier protection and particularly improved barrier protection for the wearer's wrist, ankles, neck and adjacent areas of the wearer's body while at the same time avoiding the problems associated with conventional cuff and/or collar designs.

SUMMARY OF THE INVENTION

In response to the above problems encountered by those skilled in the art, the present invention provides an elastic laminate. The elastic laminate includes at least one stretchable layer and at least one elastic liquid barrier layer. The elastic liquid barrier layer is formed from an elastic film forming material which self-adheres to the stretchable layer.

In another embodiment, the present invention provides a zoned elastic laminate having at least one stretchable layer wherein portions of the stretchable layer are selectively overlaid by at least one elastic liquid barrier layer. The elastic liquid barrier layer is formed from an elastic adhesive. The elastic liquid barrier layer self-adheres to the stretchable layer. The stretchable layer may be woven or non-woven.

Selectively overlying portions of the stretchable layer or "zoning" the stretchable layer with an elastic layer forms another elastic laminate embodiment. This elastic laminate embodiment may have portions which are elastic and liquid impermeable and other portions which are stretchable and liquid impermeable but breathable or stretchable and liquid permeable.

In another embodiment, the present invention provides an elastic laminate having at least two stretchable layers separated by an elastic liquid barrier layer. The elastic liquid barrier layer is formed from an elastic adhesive and self-adheres to the stretchable layers. The stretchable layers may be woven or non-woven. The elastic layer may be of the same or similar dimension as the stretchable layers or the elastic layer may be zoned such that portions of the resulting laminate are elastic and liquid impermeable.

In another embodiment, a surgical gown cuff may be formed from an elastic laminate which includes at least two stretchable layers separated by one elastic liquid barrier layer. The elastic liquid barrier layer is formed from an elastic adhesive and self-adheres to the stretchable layers. The stretchable layers may be aqueous liquid retentive or aqueous liquid repellent. When the stretchable layers are aqueous liquid retentive, aqueous liquids or a portion thereof, such as blood, saline, etc., which come in contact therewith are retained therein. In this way, the movement of such aqueous liquids along the length of the gown sleeve is impeded by contact and retention of the liquids or a portion thereof by the aqueous liquid retentive layer. At the same time, liquid migration between the stretchable layers is prevented by the elastic liquid barrier layer.

Additionally, the elastic laminate of the present invention may also be used in foot wear for providing a form fitting region, such as, about the wearer's ankle. The above laminate may also be use to form elastic closure tabs or diapers "ears", elastic bands for diapers and feminine care articles, and an elastic liquid impermeable surgical stockinette.

DETAILED DESCRIPTION OF THE INVENTION

Several terms may be used to describe affixing the elastic laminate of the present invention to the same such elastic laminate or to another such elastic laminate or to another structure. These terms include "join", "secure", "attach" and derivatives and synonyms thereof. The affixing of the elastic laminate of the present invention to the same such elastic laminate or to another such elastic laminate or to another structure may be accomplished by any of several conventional methods. By way of example and not limitation, these methods include self-adhering, stitching, gluing, heat sealing, zipping, snapping, sonic or thermal bonding or using a hook and loop fastening system and other methods familiar to those skilled in the art.

The term "self-adhering" is used to describe an inherent sticky or gluey property of a structure wherein such property permits, upon the application of pressure, such structure to adhere to another structure without the placement of an adhesive between the two structures. Such inherent property may be present on a surface or surfaces of such structure or may be present throughout the bulk of such structure. For example, a film formed from a pressure sensitive adhesive and secured to a surface by the application of pressure would be considered a self-adhering film. A film which is secured to a surface by applying an adhesive between the film and such surface or which requires heat or sonic bonding to secure the film to the surface would not be considered "self-adhering".

Figure 1:
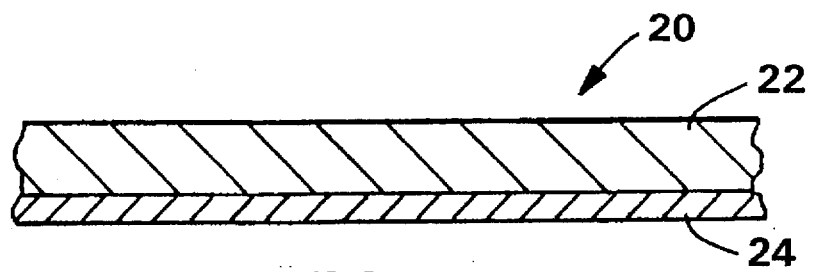
FIG. 1 is a cross-sectional view of the elastic laminate of the present invention.

Turning now to drawings and with reference to FIG. 1, the elastic laminate of the present invention is indicated by reference numeral 20. The elastic laminate 20 includes a stretchable layer 22 and a self-adhering elastic layer 24. As the elastic layer is self-adhering, the application of sufficient pressure secures the stretchable layer 22 to the elastic layer 24 without the placement of an adhesive between the stretchable layer 22 and the elastic layer 24.

The stretchable layer 22 may be liquid repellent or liquid retentive. More particularly, the stretchable layer 22 may be aqueous liquid repellent or it may be aqueous liquid retentive. The stretchable layer 22 may be formed from any suitable polymeric material.

As used herein, the term "polymeric material" means a synthetic or natural polymer material, although the former is more likely to be employed in the present invention. As used herein, the term "polymeric fabric" means a fabric prepared from any polymer material capable of being formed into a fabric.

Examples, by way of illustration only, of natural polymeric materials include, cotton, silk, wool, and cellulose. Synthetic polymeric materials, in turn, can be either thermosetting or thermoplastic materials.

Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes.

Examples of thermoplastic polymers include, by way of illustration only, end-capped polyacetals, such as poly (oxymethylene) or polyformaldehyde, poly (trichloroacetaldehyde), poly(n-valeraldehyde), poly (acetaldehyde), poly(propionaldehyde), and the like; acrylic polymers, such as polyacrylamide, poly(acrylic acid), poly (methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly (chlorotrifluoroethylene), ethylene-chlorotrifluoroethylene copolymers, poly(vinylidene fluoride), poly(vinyl fluoride), and the like; polyamides, such as poly(6-aminocaproic acid) or poly($\epsilon$-caprolactam), poly(hexamethylene adipamide), poly(hexamethylene sebacamide), poly(m-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy- 1,4-phenylene-isopropylidene-1,4-phenylene), poly (sulfonyl-1,4-phenyleneoxy-1,4-phenylenesulfonyl-4,4'-biphenylene), and the like; polycarbonates, such as poly (bisphenol A) or poly(carbonyldioxy-1,4-phenyleneisopropylidene-1,4-phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido-1,4-phenylene), and the like; polyolefins, such as polyethylene, polypropylene, poly(1-butene), poly (2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly (vinylidene chloride), polystyrene, and the like; copolymers of the foregoing, such as acrylonitrile-butadiene-styrene (ABS) copolymers, and the like; and the like. In certain embodiments, the polymeric fabric will be prepared from a polyolefin. In other embodiments, the polyolefin will be polypropylene.

The term "fabric" is used broadly herein to mean any fibrous material which has been formed into a web. That is, the fabric is composed, at least in part, of fibers of any length. Thus, the fabric can be a woven or nonwoven web, either of which are readily prepared by methods well-known to those having ordinary skill in the art. For example, nonwoven webs are prepared by such processes as meltblowing, coforming, spunbonding, carding, air laying, and wet laying. Moreover, the fabric can consist of a single layer or multiple layers. In addition, a multilayered fabric can include films, scrim, and other non-fibrous materials.

Nonwoven webs formed from polyolefin-based fibers may be used in forming the stretchable layer 22. Other nonlimiting examples of fabrics suitable for use as the stretchable layer 22 include polyester knit, bonded carded polyolefin fiber web, necked-bonded or necked-stretched polyolefin fiber spunbond web, spunbond polyolefin web, meltblown polyolefin web, spunlaced polyolefin web or nylon tricot flat knits.

The elastic layer 24 may be formed from a pressure sensitive, elastic film forming adhesive which self-adheres, upon the application of sufficient pressure, to the stretchable layer 22. Generally, the thickness of the elastic layer 24 may depend upon several factors, including, but not limited to the particular application of the elastic laminate 20 and environmental conditions associated with such application and the materials used in forming the layer 22. Desirably, the thickness of the elastic layer 24 may range from about 1 to about 5 mils, and particularly from about 2 to about 4 mils and more particularly from about 2 to about 3 mils.

The elastic layer 24 is impermeable to liquids and particularly, impermeable to aqueous liquids. In one embodiment, the elastic layer 24 may be impermeable to aqueous liquids and permeable to water vapor. Examples of materials suitable for forming the elastic layer 24 include, but are not limited to: Findley Adhesives Inc.'s (Wauwatosa, Wis.) hot melt adhesive, catalog no. H2209, and National Starch Cycloflex's (Bridgewater, N.J.) hot melt adhesives, catalog no.s 70-3776 and 70-3998.

The hot melt adhesive available from Findley Adhesive Inc. is a high viscosity, pressure sensitive adhesive. More particularly, this hot melt adhesive has a softening point of about 216° F., a density of about 0.98 g/cc, a tensile strength of about 12.58 psi and a penetrometer value of about 63.

The National Starch Cycloflex, catalog no. 70-3776 hot melt adhesive forms an aqueous liquid impermeable/water vapor permeable barrier. More particularly, this hot melt adhesive is an amber solid at room temperature, has a boiling point greater than 500° F., a bulk density of 1.07 g/ml, a specific gravity (water=1) of 0.980 and is slightly soluble in water.

The National Starch Cycloflex, catalogue no. 70-3998 hot melt adhesive forms an aqueous liquid impermeable/water vapor permeable barrier. More particularly, this hot melt adhesive is an amber solid at room temperature, has a boiling point greater than 500° F., a bulk density of 9.6 lb/gal, a specific gravity (water=1) of 1.200 and is slightly soluble in water.

When evaluating water vapor permeability, it is desirable that the WVTR, as measured by ASTM E96-93 test procedure, for such water vapor permeable barriers range from about 500 to about 4000 and particularly from about 2500 to about 4000. As such, depending upon the elastic adhesive film forming material selected, the elastic laminate or a portion thereof may either be impermeable to liquids and water vapor or impermeable to liquids but water vapor permeable.

The elastic layer 24 may further overlie all or substantially all the stretchable layer 22. The elastic layer 24 may also overlie selected portions of the stretchable layer 22. In the later instance, the resulting elastic laminate may include selected areas or zones of elasticity and permeability, depending upon the elastic adhesive film forming material selected.

Figure 2:
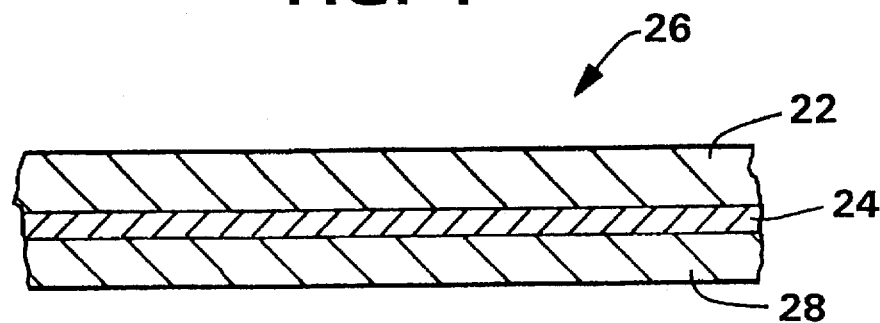
FIG. 2 is a cross-sectional view of another elastic laminate embodiment.

Referring now to FIG. 2, another embodiment 26 of the invention is similar to the elastic laminate 20 illustrated in FIG. 1 with the exception that the elastic layer 24 is sandwiched between the stretchable layer 22 and a layer 28. The layer 28 may be attached to the elastic layer 24 upon the application of sufficient pressure to the elastic laminate 26. The layer 28 may be formed from a stretchable or non-stretchable material. When formed from a stretchable material, the layer 28 may be formed from material suitable for forming the layer 22. When formed from a non-stretchable material, the layer 28 may be formed from, for example, paper, nonwovens and/or films. Furthermore, the layer 28 may be formed from a material which functions as a release layer. The release layer protects the portion of the elastic layer 24 overlaid thereby from inadvertent contact with another surface or particulate material. Examples of materials suitable for use as a release layer include, but are not limited to, silicon coated substrates, such as silicon coated paper, TEFLON® films and TEFLON® coated substrates.

Figure 3:
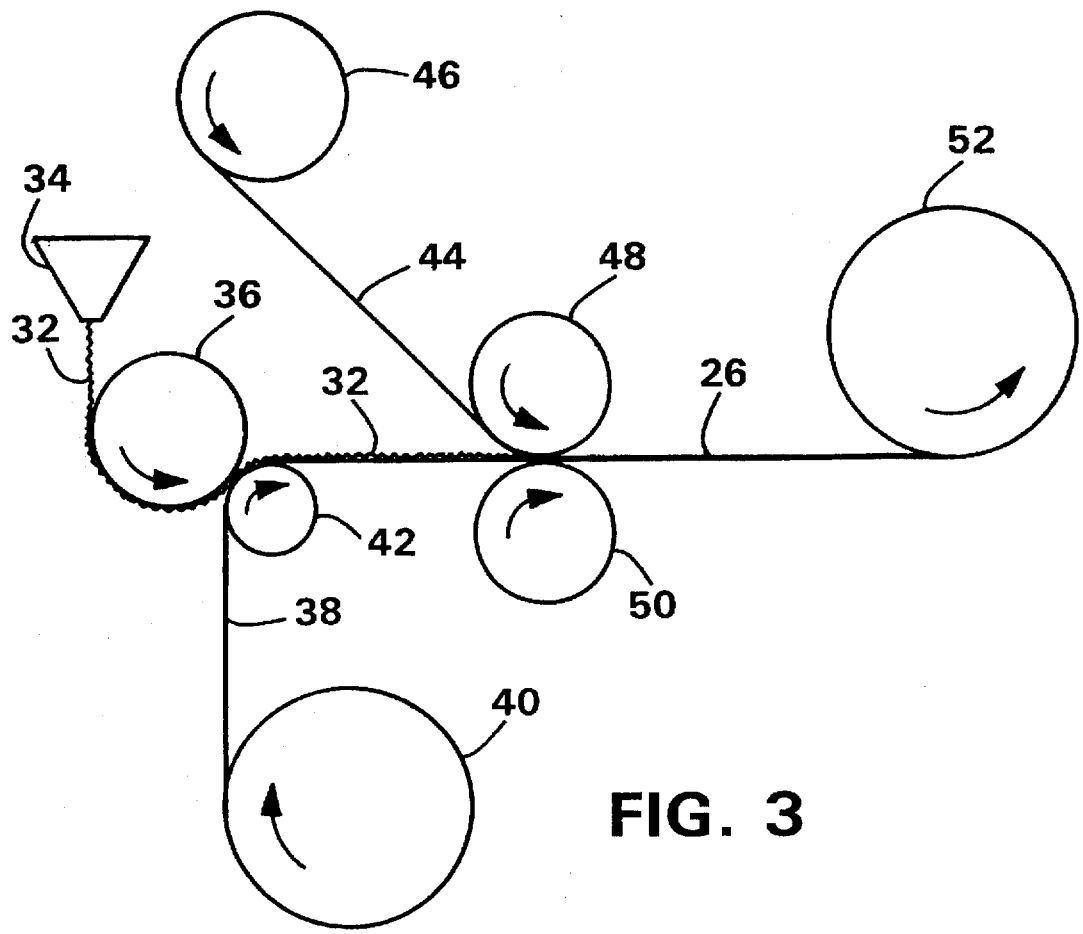
FIG. 3 is a schematic view of a processing line for forming the elastic laminate of the present invention.

Referring now to FIG. 3, a process 30 for forming the elastic laminate 26 of the present invention is schematically illustrated. The elastic laminate 26 is formed by extruding a molten material 32 which is suitable for forming the elastic layer 24 through a hot-melt die 34. The molten material 32 is deposited on a conventional rotating non-stick roller 36. Generally, the roller 36 may be coated with any number of well know materials to effectuate a non-stick surface. These materials include, but are not limited to, plasma, TEFLON®, silicon rubber and the like. Such non-stick rollers are commercially available from Plasma Coatings of Minnesota, Inc., catalog no. 915D.

A first substrate layer 38, unwound from a roll 40, is directed toward the nip between a roller 42 and the non-stick roller 36. The roller 42 is in sufficiently close proximity to the non-stick roller 36 such that the material 32 contacts, adheres, and is transferred from the non-stick roller 36 to the layer 38 as the layer 38 pass between the roller 42 and the non-stick roller 36. The layer 38 may be formed from any material suitable for forming either the layer 22 or the layer 28 as previously described.

It will be understood that the width and the thickness of the molten material 32 may be varied by varying the width of the die 34, the flow rate of the material 32 exiting the die 34 and the rotational speed of the rollers 36 and 42. Additionally, a plurality of dies may be spaced a distance apart (not illustrated) such that discrete areas of the layer 38 are contacted by the material 32.

A second substrate layer 44, unwound from a roll 46, may be directed toward the nip between the rollers 48 and 50. The second substrate layer may also be formed from material which is suitable for forming either the layer 22 or the layer 28 as previously described. At the nip between the rollers 48 and 50, the substrate layer 44 contacts and adheres to the exposed surface of the material 32, thus forming the elastic laminate 26. The elastic laminate 26 is then wound on to a roll 52.

Figure 4:
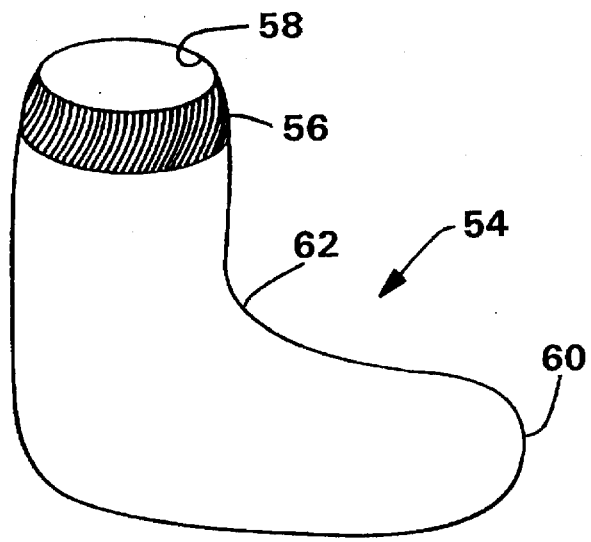
FIG. 4 is a perspective view of a foot receiving article.

Referring now to FIG. 4, a foot receiving article 54, such as a sock or a shoe cover, is illustrated. The foot receiving article 54 is generally L-shaped and tubular in construction. An elastic cuff 56 of the foot receiving article 54 defines an opening 58 for receiving a foot. Another end 60 of the foot receiving article 54 is closed and is adapted to overlie the wearer's toes. Portions of the foot receiving article 54 between the cuff 56 and the closed end 60 defines a body 62 which may be formed from woven or non-woven fabrics. The elastic cuff 56 is formed from either the elastic laminate 20 or 26 described above and is secured to the body 62. The elastic cuff 55 may function to expand and contract in concert with the wearer's movement or to elastically self-adhere to the wearer's body or another garment.

Figure 5:
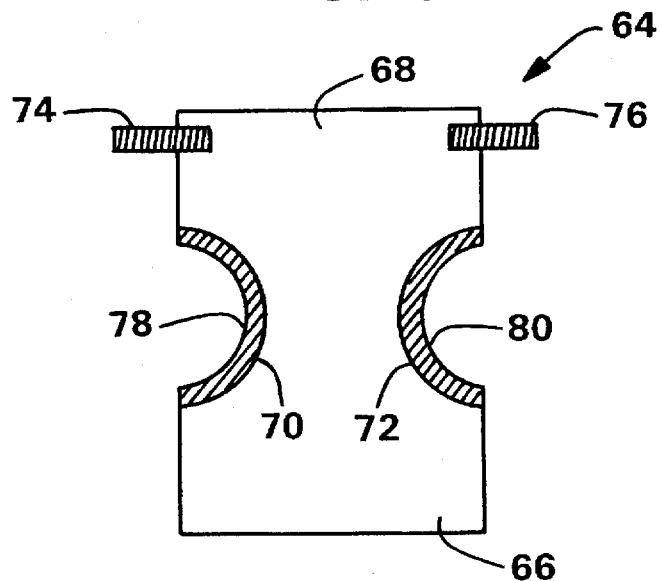
FIG. 5 is a plan view of an absorbent article.

With reference now to FIG. 5, an absorbent article 64, such as a diaper or feminine care shield, is illustrated. The absorbent article 64 is generally hour-glass shaped and includes a front flap portion 66, a rear flap portion 68 and a pair of leg receiving portions 70 and 72 located at the narrowing or converging portions of the absorbent article 64. The absorbent article 64 may further include a pair of elastic tabs or ears, 74 and 76, which may be formed from either the elastic laminate 20 or 26 described above.

When the absorbent article 64 is a diaper, the elastic tabs 74 and 76 may be used to releasably unite the front portion 66 and the rear portion 68 about the torso of the wearer. For example, in some instances, the elastic laminate 26 forming the tabs 74 and 76 on the rear portion 68 of the absorbent article 64 may be provided with a fibrous layer. The front portion 66 of the absorbent article 64 may be provided with a plurality of fiber engaging hooks (not shown). In this way, the front portion 66 and the rear portion 68 may be releasably united by the engagement of a portion of the fibrous layer of tabs 74 and 76 with the engaging hooks. Furthermore, the portions of the tabs 74 and 76 not engaging the hooks are free to expand and contract in concert with the wearer's movement.

Alternatively, all or a portion of the elastic laminate 26 forming the tabs 74 and 76 may be provided with a release layer. In this way, upon removing the release layer, the exposed self-adhering surface of the elastic layer 24 may be secured to a surface of the front portion 66. Portions of the elastic laminate 26 not secured to the front portion 66 are free to expand and contract in concert with the wearer's movement.

Additionally, the absorbent article 64 may include a pair of elastic leg cuffs, 78 and 80, positioned adjacent to the leg receiving portions 70 and 72, respectively. The leg cuffs 78 and 80, which may be water vapor permeable, may be formed from either the elastic laminate 20 or 26. The leg cuffs 78 and 80 may function to expand and contract in concert with the wearer's movement. Furthermore, the leg cuffs 78 and 80 may function to elastically adhere to the wearer's body or another garment by attaching one or more exposed or exposable surfaces of the elastic layer 24 thereto.

Figure 6:
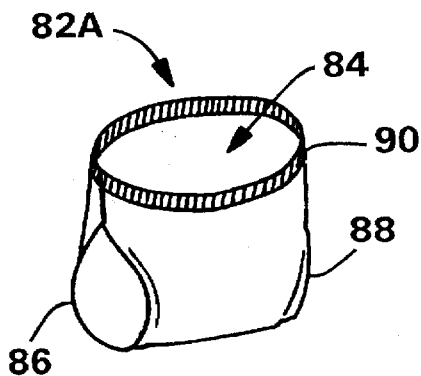
FIG. 6 is a perspective view of a garment article.
Figure 7:
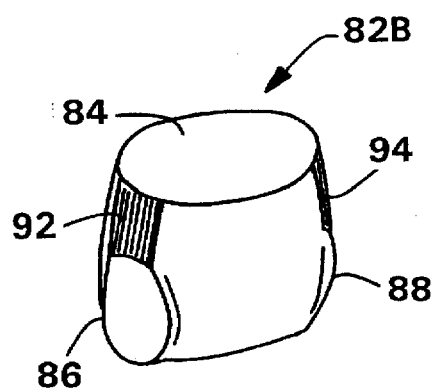
FIG. 7 is a perspective view of a garment article.

FIGS. 6 and 7 illustrate garment articles 82A and 82B, respectively. Examples of such garment articles 82A and 82B include, but are not limited, to an undergarment, and particularly an absorbent undergarment, and more particularly a training pant. Both articles 82A and 82B include portions defining a torso receiving opening 84 and a pair of leg receiving openings 86 and 88. The article 82A is provided with an elastic band 90, which may be continuous or discontinuous for encircling all or a portion of the wearer's torso. The elastic band 90 may be formed from the elastic laminate 26 and may function to expand and contract in concert with the wearer's movement. When the elastic band 90 or a portion thereof is formed from the elastic laminate 20, the elastic band 90 or such portion may function to elastically adhere to the wearer's body or another garment.

The article 82B is provided with a pair of opposed elastic zones 92 and 94. The elastic zones, 92 and 94, are positioned generally on opposite sides of the article 82B. The elastic zone 92 is located between the torso receiving opening 84 and the leg receiving opening 86. The other elastic zone 88 is located between the torso receiving opening 84 and the leg receiving opening 88. The elastic areas 92 and 94 may be formed from the elastic laminate 26 and may function to expand and contract in concert with the wearer's movement. When the elastic areas 92 and 94 or portions thereof are formed from the elastic laminate 20, the elastic areas 92 and 94 or such portions may function to elastically adhere to the wearer's body or another garment.

Figure 8:
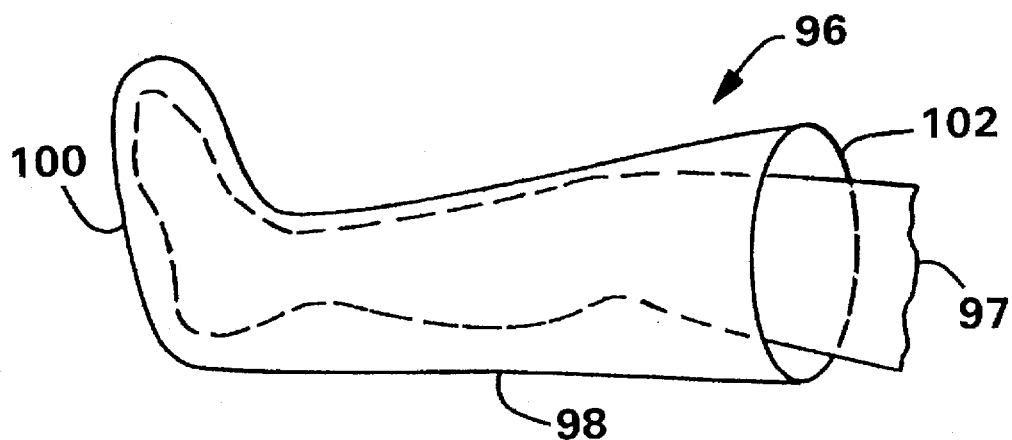
FIG. 8 is a perspective view of a stockinette.

FIG. 8 illustrates a stockinette 96 overlying a portion of a leg 97. The stockinette 96 is generally L-shaped and tubular in construction and includes a leg portion 98 and a foot portion 100. The leg portion 98 terminates at one end with an annular leg receiving opening 102. The stockinette 96 may be formed from the elastic laminate 26 and may function to expand and contract in concert with the wearer's movement. When the stockinette 96 or a portion thereof is formed from the elastic laminate 20, the stockinette 96 or such portion may function to elastically adhere to the wearer's body or another garment.

Figure 9:
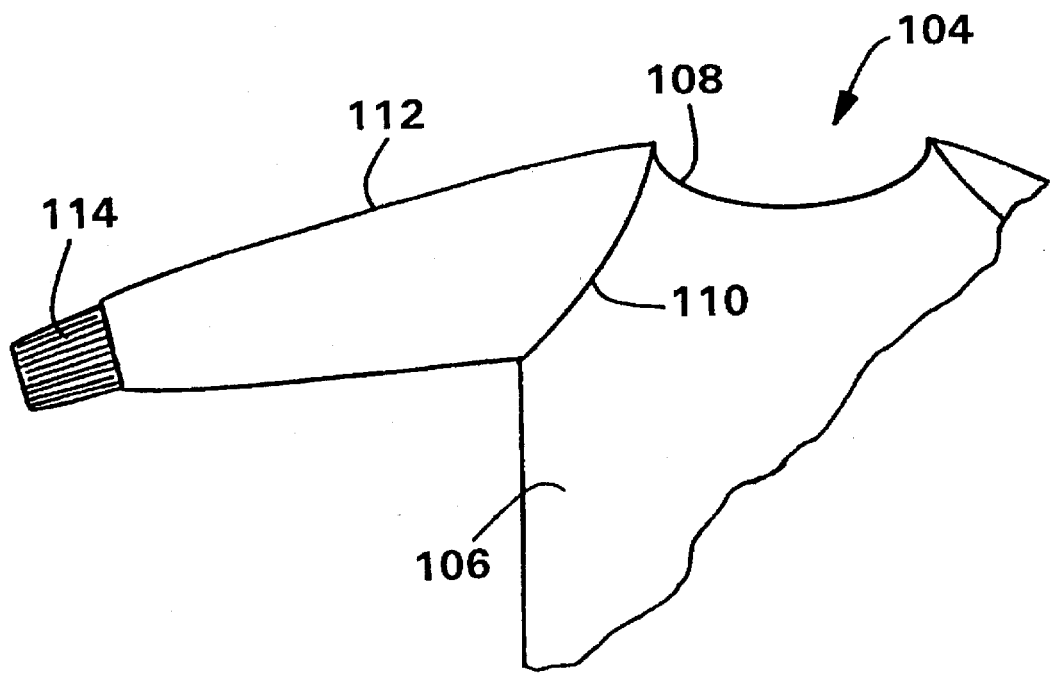
FIG. 9 is a fragmentary plan view of a surgical gown.

FIG. 9 illustrates a portion of a surgical gown 104. The surgical gown includes a body 106, portions of which define a neck opening 108 and a sleeve opening 110. One end of a sleeve 112 is secured to the body 106 about the sleeve opening 110 and a cuff 114 is secured to the other end of the sleeve 112. The cuff 114 may be formed from the elastic laminate 26 and may function to expand and contract in concert with the wearer's movement. When the cuff 14 or a portion thereof is formed from the elastic laminate 26, the cuff 14 or such portion may function to elastically adhere to the wearer's body or another garment.

EXAMPLES

The following examples demonstrate several embodiments of the present invention. Elasticity and stretch testing for several elastic laminates are reported. Such examples, however, are not to be construed as limiting in any way either the spirit or scope of the present invention.

EXAMPLE 1

Six inch (cross direction) by four inch (machine direction) elastic laminates having an elastic layer captured between a pair of stretchable layers were prepared in accordance with the method describe above. The elastic adhesive used to form the samples analyzed in EXAMPLE 1 was H2209, described above. Each of the stretchable layers was formed from a knit substrate, and particularly a 1×1 rib knit, 100% spun polyester. Three sample sets, which included three samples per set, were evaluated. The thickness of the elastic layer for each sample set was varied, i.e., 2, 3 and 4 mils. The force required to elongate in the cross direction the samples to 100%, 200% and 300% of their relaxed, non-biased length are reported in kilograms (kg) in Table I.

The elasticity or recovery value, expressed in inches, was obtained by measuring then marking a one inch segment on several relaxed samples. A force was applied sufficient to elongate these marked samples to 100% of their relaxed length. After 100% elongation was achieved, the force was removed and the sample allowed to relax. The originally marked one inch segment on each of the samples was then remeasured. The remeasured value is reported under "Recovery Length" in TABLE I.

For each category, the average value for three samples is reported. An Instron Model 1122, serial number 5050 was used to obtain the results reported in TABLE I.

TABLE I

| KNIT ELASTIC LAMINATE | | | | |
|---|---|---|---|---|
| Elastic Adhesive Thickness in Mils | 100% (kg) | 200% (kg) | 300% (kg) | Recovery Length (inches) |
| 4 | 2.0 | 4.5 | 7.0 | 1.08 |
| 3 | 2.2 | 4.8 | 8.3 | 1.02 |
| 2 | 2.03 | 5.0 | 8.0 | 1.04 |

The results reported in Table I, under the heading "Recovery Length" indicate that upon stretching the tested samples to 100% of their relaxed length and then permitting the tested samples to re-relax, these samples recovered to between about 92% to about 98% of their original unstretched length.

EXAMPLE 2

Several six inch (machine direction) by four inch (cross direction) elastic laminates having an elastic layer formed from the elastic adhesive H2209 and captured between a pair of stretchable layers formed from polypropylene spunbond were prepared in accordance with the method described above. Each of the stretchable layers was formed from a polypropylene neck stretched spunbond material having a weight about 1.0 ounces per square yard (osy). Generally, the process for manufacturing neck stretched spunbond is described in the following U.S. Pat. Nos. 5,336,545; 5,226,992; 4,981,747; 4,965,122; and 5,320,891 which are all herein incorporated by reference.

The test equipment, the categories and the methods used to evaluate the samples in EXAMPLE 1 were used to evaluate the samples in EXAMPLE 2. The results for the EXAMPLE 2 samples are reported in TABLE II.

TABLE II

| SPUNBOND ELASTIC LAMINATE | | | | |
|---|---|---|---|---|
| Elastic Adhesive Thickness in Mils | 100% (kg) | 200% (kg) | 300% (kg) | Recovery Length (inches) |
| 4 | 2.8 | 8.7 | Tear* | 1.11 |
| 3 | 3.5 | 8.5 | Tear* | 1.12 |
| 2 | 3.4 | 8.7 | Tear* | 1.12 |

*When approaching 300% elongation, a tear in at least one of the spunbond layers was observed.

The results reported in Table II, under the heading "Recovery Length" indicate that upon stretching the tested samples to 100% of their relaxed length and then permitting the tested samples to re-relax these samples recovered to between about 89% to about 88% of their original unstretched length.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. An elastic laminate comprising:
    at least one stretchable layer; and
    an elastic adhesive layer which self-adheres to substantially all of the surface area of the at least one stretchable layer and forms an elastic liquid barrier layer; wherein the at least one stretchable layer is unnecked when bonded to the elastic adhesive layer.

2. The laminate of claim 1 wherein the at least one stretchable layer is a fabric selected from the group consisting of polyester knit, bonded carded web, spunbond web, meltblown web and spunlaced web.

3. The laminate of claim 1 wherein the at least one stretchable layer is adapted to retain a liquid.

4. The laminate of claim 1 wherein two stretchable layers are secured to the elastic adhesive layer such that the stretchable layers are separated by the elastic adhesive layer.

5. The laminate of claim 1 wherein the elastic adhesive is selected from the group consisting of pressure sensitive elastics and hot melt adhesives.

6. The laminate of claim 1 wherein the thickness of the elastic adhesive layer is between about 1 mil to about 5 mils.

7. The laminate of claim 1 wherein the thickness of the elastic adhesive layer is between about 2 mils to about 3 mils.

8. The laminate of claim 1 wherein the elastic liquid barrier layer is water vapor permeable.

9. The laminate of claim 8 wherein the elastic liquid barrier layer has a water vapor permeability of about 500 to about 4000, as measured by an ASTM E96-93 test procedure.

10. A stockinette formed from the elastic laminate of claim 1.

11. An elastic waist band for a garment formed from the elastic laminate of claim 1.

12. An elastic closure tab for a diaper formed from the elastic laminate of claim 1.

13. A cuff formed from the elastic laminate of claim 1.

14. A surgical gown comprising:
    a sleeve and a cuff attached to the sleeve, wherein the cuff is formed from the elastic laminate of claim 1.

15. A zoned elastic laminate comprising:

at least one stretchable layer; and an elastic adhesive layer overlying and self-adhering to a substantial portion of the surface area of the at least one stretchable layer and forming an elastic liquid barrier layer; wherein the at least one stretchable layer is unnecked when bonded to the elastic adhesive layer.

16. The laminate of claim 15 wherein the at least one stretchable layer is a fabric selected from the group consisting of polyester knit, bonded carded web, spunbond web, meltblown web and spunlaced web.

17. The laminate of claim 15 wherein the at least one stretchable layer is adapted to retain a liquid.

18. The laminate of claim 15 wherein two stretchable layers are secured to the elastic layer such that the stretchable layers are separated by the elastic layer.

19. The laminate of claim 15 wherein the elastic layer is selected from the group consisting of pressure sensitive elastics and hot melt adhesives.

20. The laminate of claim 15 wherein the thickness of the elastic liquid barrier layer is between about 1 mil to about 5 mils.

21. The laminate of claim 15 wherein the thickness of the elastic liquid barrier layer is between about 2 mils to about 3 mils.

22. The laminate of claim 15 wherein the elastic liquid barrier layer is water vapor permeable.

23. The laminate of claim 15 wherein the elastic liquid barrier layer has a water vapor permeability of about 500 to about 4000, as measured by an ASTM E96-93 test procedure.

24. A stockinette formed from the elastic laminate of claim 15.

25. An elastic band for a garment formed from the elastic laminate of claim 15.

26. An elastic band for a feminine care article formed from the elastic laminate of claim 15.

27. A cuff formed from the elastic laminate of claim 15.

28. A surgical gown comprising:

a sleeve and a cuff attached to the sleeve, wherein the cuff is formed from the elastic laminate of claim 15.

29. A tubular cuff comprising:

at least one stretchable layer, and an elastic adhesive layer which self-adheres to a substantial portion of the surface area of the at least one stretchable layer and forms an elastic liquid barrier layer; wherein the at least one stretchable layer is unnecked when bonded to the elastic adhesive layer.

* * * * *